United States Patent
Boivin et al.

(10) Patent No.: US 8,996,870 B2
(45) Date of Patent: Mar. 31, 2015

(54) METHOD FOR PROTECTING A RECORDED MULTIMEDIA CONTENT

(75) Inventors: Mathieu Boivin, Aulnay-sous-Bois (FR); Gilles Dubroeucq, Saint Piat (FR)

(73) Assignee: Viaccess, Paris la Defense (FR)

( * ) Notice: Subject to any disclaimer, the term of this patent is extended or adjusted under 35 U.S.C. 154(b) by 0 days.

(21) Appl. No.: 14/112,420

(22) PCT Filed: Apr. 12, 2012

(86) PCT No.: PCT/EP2012/056607
§ 371 (c)(1),
(2), (4) Date: Oct. 17, 2013

(87) PCT Pub. No.: WO2012/143278
PCT Pub. Date: Oct. 26, 2012

(65) Prior Publication Data
US 2014/0059349 A1   Feb. 27, 2014

(30) Foreign Application Priority Data
Apr. 19, 2011   (FR) ...................................... 11 53391

(51) Int. Cl.
H04L 9/22       (2006.01)
H04L 29/06      (2006.01)
H04N 21/258     (2011.01)
H04N 21/433     (2011.01)
H04N 21/4405    (2011.01)
H04N 21/4408    (2011.01)
H04N 21/4623    (2011.01)
H04N 21/4788    (2011.01)
H04N 21/63      (2011.01)
H04N 21/266     (2011.01)
(Continued)

(52) U.S. Cl.
CPC ...... *H04L 63/0428* (2013.01); *H04N 21/26609* (2013.01); *H04N 7/1675* (2013.01); *H04N 21/63345* (2013.01); *H04N 21/25816* (2013.01); *H04N 21/25875* (2013.01); *H04N 21/26606* (2013.01); *H04N 21/26613* (2013.01); *H04N 21/4334* (2013.01); *H04N 21/4405* (2013.01); *H04N 21/4408* (2013.01); *H04N 21/4623* (2013.01); *H04N 21/4788* (2013.01); *H04N 21/632* (2013.01)
USPC .......................................................... 713/168

(58) Field of Classification Search
CPC .......... H04N 7/1675; H04N 21/63345; H04N 21/26609
USPC .......................................................... 713/168
See application file for complete search history.

(56) References Cited

U.S. PATENT DOCUMENTS

| | | | |
|---|---|---|---|
| 2002/0129249 A1* | 9/2002 | Maillard et al. | ............... 713/172 |
| 2004/0022271 A1* | 2/2004 | Fichet et al. | ................... 370/486 |
| 2004/0168063 A1* | 8/2004 | Revital et al. | ................. 713/172 |

(Continued)

FOREIGN PATENT DOCUMENTS

| | | |
|---|---|---|
| EP | 1575291 | 9/2005 |
| EP | 1806671 | 7/2007 |

(Continued)

*Primary Examiner* — Techane Gergiso
(74) *Attorney, Agent, or Firm* — Occhiuti Rohlicek LLP

(57) ABSTRACT

A method for protecting recorded multimedia content and enabling the recorded multimedia content to be shared between recorders and readers of multimedia content connected to one another via a wide area information transmission network.

17 Claims, 3 Drawing Sheets

(51) Int. Cl.
  *H04N 7/167*      (2011.01)
  *H04N 21/6334*   (2011.01)

(56) References Cited

U.S. PATENT DOCUMENTS

| | | |
|---|---|---|
| 2004/0194125 A1 | 9/2004 | Miyazawa et al. |
| 2005/0262529 A1 | 11/2005 | Neogi et al. |
| 2006/0117090 A1 | 6/2006 | Schellingerhout et al. |
| 2008/0253564 A1 | 10/2008 | Kahn et al. |
| 2010/0235624 A1* | 9/2010 | Candelore .................... 713/155 |
| 2010/0274730 A1 | 10/2010 | Wang et al. |
| 2010/0275270 A1 | 10/2010 | Wang et al. |

FOREIGN PATENT DOCUMENTS

| | | |
|---|---|---|
| WO | WO2004/055652 | 7/2004 |
| WO | WO2007/146763 | 12/2007 |

* cited by examiner

METHOD FOR PROTECTING A RECORDED MULTIMEDIA CONTENT

RELATED APPLICATIONS

Under 35 USC 371, this is the national stage entry of PCT/EP2012/056607, filed on Apr. 12, 2012, which claims the benefit of the priority date of FR 1153391, filed Apr. 19, 2011, the contents of which are incorporated herein by reference in their entirety.

FIELD OF DISCLOSURE

The invention relates to a method for protecting a recorded multimedia content that enables this recorded multimedia content to be shared between a set of a number of recorders and a number of readers of multimedia contents connected to one another via a wide area information transmission network. Also the subjects of the invention are an authorization server, a sharing server, a recorder, a reader and a network head for implementing this method.

BACKGROUND

Scrambling multimedia contents makes it possible to subject the descrambling of these multimedia contents to the acquisition, through payment, of an access right whose validity is checked each time the multimedia contents are accessed.

In this context, it is also necessary to protect the multimedia contents transmitted in scrambled form and then recorded. In practice, if the possibility of recording the multimedia content is left without read protection, then said multimedia content can be reused and reread indefinitely by the holder of the rights, and freely made available, and usable in readable form by other users who have not acquired the access rights required to view this multimedia content. Now, these days, it is very easy to broadcast a recorded multimedia content to a large number of people, notably via sharing networks. For example, a sharing network is a station-to-station network, better known as "peer-to-peer" network. In another alternative, the sharing is done by using hosted servers.

It has therefore already been proposed to record multimedia contents in scrambled form. Thus, the applicant knows a method for protecting a recorded multimedia content in which:
a) a network head broadcasts on a channel a scrambled multimedia content and ECM (Entitlement Control Message) messages containing cryptograms $CW^{Ka}$ of control words CW enabling each to descramble a respective cryptoperiod of the scrambled multimedia content,
b) any one of the recorders receives the scrambled multimedia content and the ECM messages and decrypts the cryptogram $CW^{Ka}$ contained in the ECM message received with a subscription key $K_a$ and read-protects the scrambled multimedia content using a key $KH_e$ by encrypting the decrypted control words with the local key $KH_e$ to generate cryptograms $CW^{KHe}$,
c) the recorder records the cryptograms $CW^{KHe}$ and the scrambled multimedia content with the control words CW.

In most cases, the recorder is implemented in a terminal inside which a reader is also implemented which enables the recorded multimedia content to be read or played in clear.

The expression "in clear" denotes the fact that the multimedia content read is directly perceptible and comprehensible to a human being. In other words, the in clear multimedia content is the result of a correct descrambling of the scrambled multimedia content.

In these known methods, the local key $KH_e$ is generated locally by the terminal and kept secret in a security processor. Thus, only the reader of this terminal can play in clear the recorded multimedia content protected by means of this key.

State of the art is also known from:
US2005/262529A1,
US2008/253564A1,
EP1575291A2,
WO2007/146763A2,
US20041194125A1.

SUMMARY

The invention aims to remedy this drawback while preventing the completely unrestricted sharing of the recorded multimedia content through sharing networks.

Its subject is therefore a method for protecting a multimedia content in which:
d) an authorization server, common to all the readers, receives an identifier of the channel on which the multimedia content has been broadcast by the network head,
e) in response to a request to read the recorded multimedia content, by any one of the readers, the authorization server determines whether this reader is authorized or not to descramble the multimedia content recorded on this channel according to the access authorizations, associated with the reader, and the received channel identifier,
f) if the reader is not authorized to descramble the multimedia content recorded on this channel, the reading, by this reader, of the recorded multimedia content is prevented,
g) only if the reader is authorized to descramble the multimedia content recorded on this channel, the cryptograms $CW^{KHe}$ are decrypted with the key $KH_e$ then the duly decrypted control words CW are reencrypted with a local key $KH_l$ of the reader and finally the cryptograms $CW^{KHl}$ are transmitted to the reader, and
h) the reader downloads the scrambled multimedia content recorded by the recorder, receives the cryptograms $CW^{KHl}$ and decrypts them with its local key $KH_l$ then descrambles the downloaded multimedia content with the decrypted control words CW.

In the above method, the reading of the multimedia content recorded on a channel is possible only if the reader is associated with access authorizations enabling it to view a recording on this channel. Thus, by virtue of this method, the channel operator can control the sharing of the recorded multimedia content in the same way as he or she can control which readers are authorized to descramble in real time the multimedia content broadcast on this channel. The expression descrambling in real time denotes the descrambling of the multimedia content as it is broadcast by the network head.

Furthermore, the access authorizations are controlled by an authorization server separate from the reader, which increases the robustness of the method with respect to pirating attempts.

The robustness of the method is also guaranteed by the fact that the cryptograms of the control words used to descramble the recorded multimedia content are only constructed if the reader is authorized to view this channel.

The embodiments of this protection method may comprise one or more of the following features:
 in the step a), the broadcast ECM messages contain the identifier of the channel, the authorization server also receives the cryptograms $CW^{KHe}$ associated with the received channel identifier, and the authorization server:

checks the authenticity of the channel identifier associated with at least one of the cryptograms $CW^{KHe}$ received by comparing the control word or words received to the control words CW contained in the ECM messages broadcast by the network head on the channel corresponding to the received channel identifier, and prevents the reading, by this reader, of the recorded multimedia content if there is no correlation between the control words CW compared;

each of the recorders stores, in a memory space specific to it, the multimedia content or contents that it has recorded, a sharing server, common to all the recorders, constructs a catalogue containing at least one identifier of each recorded multimedia content associated with at least one identifier of the recorder storing this recorded multimedia content, in response to the selection, in this catalogue, by any one of the readers, of an identifier of a recorded multimedia content, the reader receives at least one of the recorder identifiers storing this recorded multimedia content and downloads, via the wide area information transmission network, the recorded multimedia content from the recorder or recorders for which the identifier has been received;

a sharing server, common to all the recorders, constructs a catalogue containing at least one identifier of each multimedia content recorded by the recorders, associated with a list of a number of identifiers of recorders having recorded this multimedia content, in response to the selection, in this catalogue, by any one of the readers, of an identifier of a multimedia content, the authorization server tries to set up a connection with a recorder corresponding to one of the recorder identifiers of the list associated with the identifier of the selected multimedia content to obtain the cryptograms $CW^{KHe}$ and, if the connection fails, the authorization server tries to set up a connection with another recorder corresponding to one of the other identifiers of the same list;

in response to the recording of a multimedia content, the recorder transmits, to the sharing server, the identifier of the recorded multimedia content and its own recorder identifier and, the sharing server constructs the catalogue from the information transmitted by the recorders;

the network head transmits each ECM message associated with a current time fragment identifier, the channel being divided into a multitude of successive time fragments so that the recorded multimedia content is distributed over a number of time fragments, the fragment identifier uniquely identifying one of these fragments and the current fragment identifier identifying the time fragment of the channel currently being broadcast by the network head, the duration of a time fragment being greater than or equal to the duration of a cryptoperiod, a sharing server, common to all the recorders, constructs a list associating, for each complete fragment recorded by a recorder, the identifier of this fragment and at least one identifier of a recorder having recorded this complete fragment, and in the step g), for each fragment of the multimedia content, the recorder from which the cryptogram $CW^{KHe}$ can be obtained is identified by virtue of the recorder identifier associated with the identifier of this fragment in the list and this cryptogram $CW^{KHe}$ is obtained from the duly identified recorder;

the network head transmits each ECM message associated with a current time fragment identifier, the channel being divided into a multitude of successive time fragments so that the recorded multimedia content is distributed over a number of time fragments, the fragment identifier uniquely identifying one of these fragments and the current fragment identifier identifying the time fragment of the channel currently being broadcast by the network head, the duration of a time fragment being greater than or equal to the duration of a cryptoperiod, a sharing server, common to all the recorders, constructs a list associating, for each complete fragment recorded by a recorder, the identifier of this fragment and at least one identifier of a recorder having recorded this complete fragment, and for each fragment of the multimedia content, the reader identifies the recorder from which this fragment can be downloaded by virtue of the recorder identifier associated with the identifier of this fragment in the list then downloads this fragment from the identified recorder;

when one and the same multimedia content or one and the same complete time fragment has been recorded by a number of distinct recorders:

the sharing server selects, only from the identifiers of these recorders, a more restricted number of recorder identifiers according to:

the geographic proximity between the reader and these recorders, or the bandwidth available for exchanging information with these recorders, and the sharing server associates, in the constructed list, the identifier of this multimedia content or fragment only with the selected recorder identifiers;

in response to the recording of a complete fragment of the multimedia content, the recorder transmits to the sharing server the identifier of this complete fragment and its own recorder identifier, and the sharing server constructs the list from these fragment and recorder identifiers transmitted.

These embodiments of the method also offer the following advantages:

checking the authenticity of the received channel identifier makes it more difficult to falsify this identifier to enable readers which do not have the access authorizations required to nevertheless read the multimedia content recorded on this channel;

using the memory spaces of each of the recorders simplifies the implementation of this method because the use of a common server for storing recorded multimedia contents is made unnecessary;

the use of a list of a number of recorder identifiers makes it possible to limit the errors caused by the disconnection of a recorder from the network;

the use of fragments makes it possible to obtain the different control words needed to view the multimedia content even if this multimedia content has not been entirely recorded by one and the same recorder;

the use of fragments makes it possible to download the multimedia content from different recorders;

selecting the recorder identifiers according to the geographic proximity or the bandwidth increases the effectiveness of the sharing method.

Also the subject of the invention is a storage medium comprising instructions for executing the above method when these instructions are executed by an electronic computer.

Also subjects of the invention are a server, a recorder or a reader for implementing the above method, in which this server, this recorder and/or this reader comprises:

a programmable electronic computer, and an information storage medium containing instructions for implementing the above method when these instructions are executed by the electronic computer.

The authorization server can be configured to:
receive an identifier of the channel on which the multimedia content has been transmitted by the network head,
in response to a request to read the recorded multimedia content, by any one of the readers, determine whether this reader is authorized or not to descramble the multimedia content recorded on this channel according to the access authorizations, associated with the reader, and the received channel identifier,
if the reader is not authorized to descramble the multimedia content recorded on this channel, prevent the reading by this reader of the recorded multimedia content, and
only if the reader is authorized to descramble the multimedia content recorded on this channel, authorize the decryption of the cryptograms $CW^{KHe}$ with the key $KH_e$ then the reencryption of the duly decrypted control words CW with a local key $KH_f$ of the reader and the transmission of the cryptograms $CW^{KHf}$ to the reader.

The sharing server can be configured to:
construct a catalogue containing at least one identifier of each recorded multimedia content associated with at least one identifier of the recorder storing this recorded multimedia content or having recorded this multimedia content, or
construct a list associating, for each complete fragment recorded by a recorder, the identifier of this fragment and at least one identifier of a recorder having recorded this complete fragment.

The recorder can be configured to:
in response to the recording of a multimedia content, transmit to the sharing server the identifier of the recorded multimedia content and its own recorder identifier, or
in response to the recording of a complete fragment of the multimedia content, the recorder transmits to the sharing server the identifier of this complete fragment and its own recorder identifier.

Also the subject of the invention is a network head for implementing the above method, this network head comprising a conditional access system, in which the conditional access system comprises:
a programmable electronic computer, and
an information storage medium containing instructions for implementing the above method when these instructions are executed by the electronic computer.

BRIEF DESCRIPTION OF THE FIGURES

The invention will be better understood on reading the following description, given only as a nonlimiting example and with reference to the drawings in which.

DETAILED DESCRIPTION

In these figures, the same references are used to designate the same elements.
Hereinafter in this description, the features and functions that are well known to those skilled in the art are not described in detail. Furthermore, the terminology used is that of the conditional access systems having multimedia contents. For more information on this terminology, the reader can refer to the following document:

"Functional Model of Conditional Access System", EBU Review, Technical European Broadcasting Union, Brussels, BE, No. 266, 21 Dec. 1995.

Figure 1:
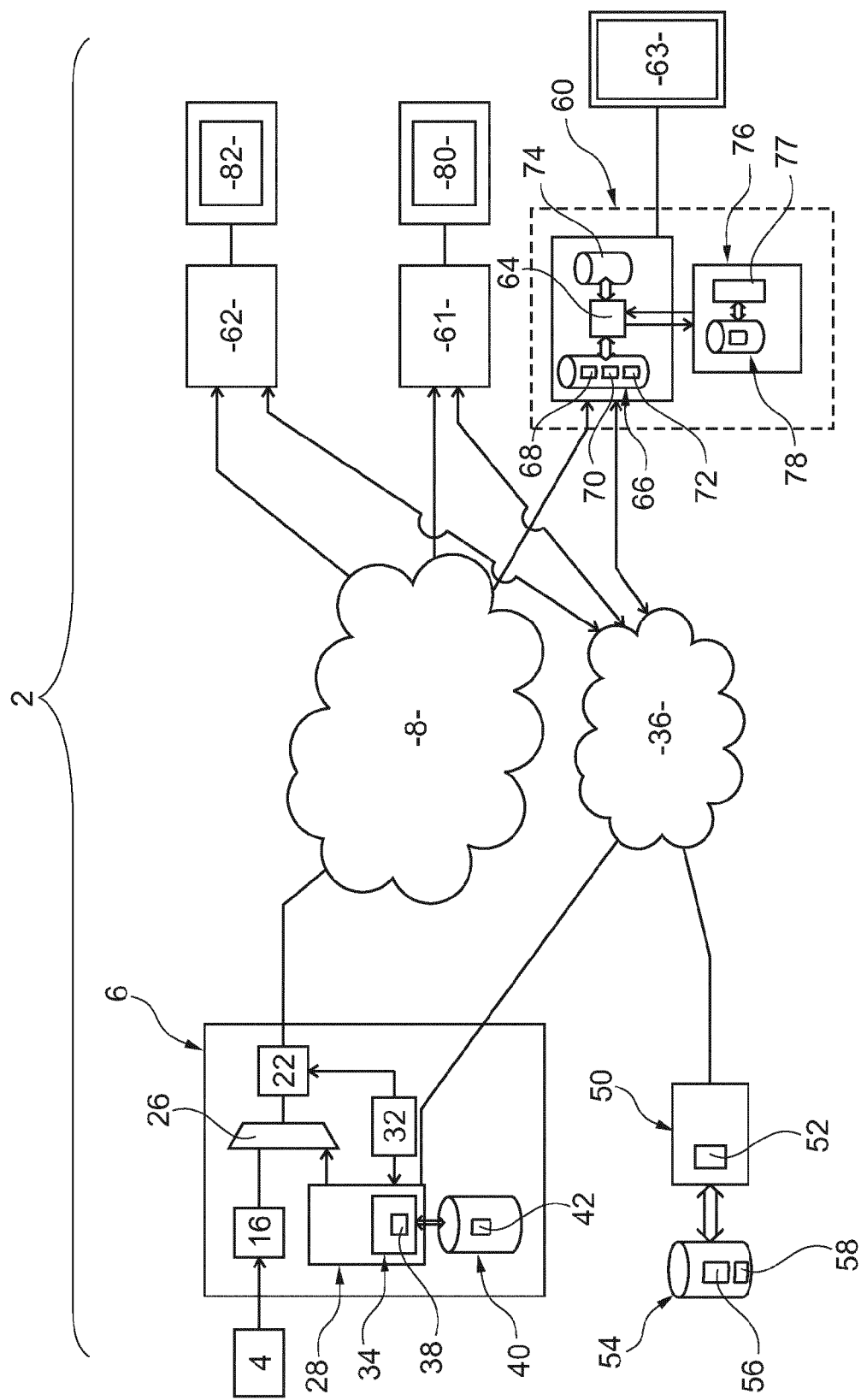
FIG. 1 is a schematic illustration of a system for transmitting and receiving scrambled multimedia contents.

FIG. 1 represents a system 2 for transmitting and receiving scrambled multimedia contents. The multimedia contents transmitted are linearized multimedia contents. The linearized multimedia contents are multimedia contents for which the instant broadcasting is set on the network head independently of a command from a user. Typically, the instants of broadcasting are set by a program schedule. For example, a multimedia content corresponds to a sequence of an audiovisual program such as a television transmission or a film broadcast on a television channel. On the other hand, video on demand is not a linearized content since the instant of broadcasting is set by the end user.

The multimedia contents in clear that are broadcast on a television channel are generated by one or more sources 4 and transmitted to a network head 6. The network head 6 simultaneously broadcasts each channel to a multitude of receiving terminals via an information transmission network 8. The multimedia contents broadcast are, for example, synchronized in time with one another to observe a preestablished program schedule.

The network 8 is typically a wide area information transmission network such as the Internet network or a satellite network or any other broadcasting network such as the one used for the transmission of digital terrestrial TV (TNT).

The network head 6 comprises an encoder 16 which compresses the multimedia contents that it receives. The encoder 16 processes digital multimedia contents. For example, this encoder functions in accordance with the MPEG2 (Moving Picture Expert Group—2) standard or the ITU-T H264 standard.

The compressed multimedia contents are directed to an input of a multiplexer 26. ECM (Entitlement Control Message) and EMM (Entitlement Management Message) messages and the compressed multimedia contents are multiplexed by the multiplexer 26. The ECM and EMM messages are supplied by a conditional access system 28. Then, the duly created multiplexed stream is scrambled by a scrambler 22 before being transmitted over the network 8.

The scrambler 22 scrambles each multiplexed stream to condition the viewing of the multimedia contents on certain conditions such as the purchase of an access entitlement by the users of receiving terminals.

The scrambler 22 scrambles each multiplexed stream using control words $CW_t$ which are supplied to it, and to the conditional access system 28, by a key generator 32. More specifically, each multiplexed stream is divided into a succession of cryptoperiods. Throughout the duration of a cryptoperiod, the conditions of access to the scrambled multimedia content remain unchanged. In particular, throughout the duration of a cryptoperiod, the multimedia content is scrambled with the same control word $CW_t$. Generally, the control word $CW_t$ varies from one cryptoperiod to another.

Furthermore, the control word $CW_t$ is generally specific to a multimedia content, the latter being drawn randomly or pseudo-randomly. The index t is a serial number identifying the cryptoperiod scrambled with this control word $CW_t$.

Here, all the components of the multimedia content, that is to say in particular the audio, the video, the teletext, are scrambled with the same control word $CW_t$. For example, the multimedia contents are scrambled at the TS (Transport Stream) level.

Typically, this scrambling conforms to a standard such as DVB-CSA ("Digital Video Broadcasting—Common Scrambling Algorithm", the implementation of which is described in the DVB ETR 289 standard), ISMA Cryp (Internet Streaming Media Alliance Encryption and Authentication), SRTP (Secure Real-time Transport Protocol), AES ("Advanced Encryption Standard", the implementation of which is described in the ATIS-0800006 standard), etc.

The system 28 is better known by the acronym CAS (Conditional Access System). For each channel, the system 28 generates messages $ECM_t$ (Entitlement Control Message) containing at least the cryptogram $CW_t^{Ka}$ of the control word $CW_t$ generated by the generator 32 and used by the scrambler 22 to scramble the cryptoperiod t of the channel. The cryptogram $CW_t^{Ka}$ is obtained by the system 28 by encrypting the control word $CW_t$ using a subscription key $K_a$. The key $K_a$ is typically a key which is only modified no more than once a month. Hereinafter in this description, "$A^B$" is used to denote the cryptogram obtained by encrypting the datum A using the key B.

The system 28 inserts into each ECM in particular:
the cryptograms $CW_t^{Ka}$ and $CW_{t+1}^{Ka}$ of the control words $CW_t$ and $CW_{t+i}$ enabling the immediately consecutive cryptoperiods t and t+1 of the channel to be descrambled,
access conditions CA intended to be compared to access entitlements acquired by the user,
an identifier CHANNEL-ID of the channel on which the multimedia content is broadcast,
a time index $ECM\text{-}REF_t$ associated with this channel, and
a cryptographic redundancy MAC, such as a digital signature, enabling the integrity of the ECM message to be checked.

The time index $ECM\text{-}REF_t$ identifies the cryptoperiod $CP_t$ of the multimedia content which has to be descrambled with the control word $CW_t$. For example, the time index $ECM\text{-}REF_t$ is a counter incremented by a predetermined step on each transmission of a new message $ECM_t$ on the channel corresponding to the identifier CHANNEL-ID. This time index is reset at regular intervals. The duration $\Delta_{ECM\text{-}REF}$ of this interval is greater than 2 hours and, preferably, greater than 24 or 48 hours.

The system 28 can also insert into the ECM messages:
an identifier FRAG-ID of the television channel fragment currently broadcast by the network head 6, or
a prohibition to record the multimedia content.

The use of fragment identifiers is described with reference to the method of FIG. 3.

The ECM message containing the pair of cryptograms $CW_t^{Ka}/CW_{t+1}^{Ka}$ is denoted $ECM_t$ hereinafter in the description, in which the index t is a serial number identifying the position in time of this ECM message relative to the other different ECM messages transmitted to descramble the same multimedia content. Here, the index t identifies the cryptoperiod $CP_t$ which can be descrambled using the control word $CW_t$ contained in the message $ECM_t$.

As an illustration, here, the scrambling and the multiplexing of the multimedia contents conform to the DVB-Simulcrypt protocol (ETSI TS 103 197).

The system 28 also generates EMM (Entitlement Management Message) messages. These EMM messages contain in particular the access entitlements addressed to the receiving terminals or the subscription key $K_a$. In practice, unlike the ECM messages used here, the EMM messages may be addressed to a single particular receiving terminal out of all the terminals of the system 2.

Here, the ECM and EMM messages respond to the syntax defined in the standard DVB ETR 289 ("Support for use of scrambling and conditional access within digital broadcasting systems").

The system 28 comprises in particular an authorization server 34 better known by the acronym SAS (Subscriber Authorization System).

Here, the server 34 is notably configured to authorize and, alternatively, prevent the viewing of a recorded multimedia content. To this end, it is connected to a bidirectional information exchange network 36. For example, the network 36 is the Internet network. The server 34 comprises a programmable electronic computer 38 suitable for executing instructions stored on an information storage medium. To this end, it is connected to a memory 40 containing instructions for the execution of the method of FIG. 2 or 3 when they are executed by the computer 38. The memory 40 also comprises a table 42 associating with each identifier STB-ID of a receiving terminal of the system 2, the following fields:
a field "AA" containing an access authorization specifying only one or more television channels out of a greater set of television channels broadcast by the network head and that this terminal can receive,
a field containing a personal key $KH_i$ which uniquely identifies this terminal out of all the receiving terminals of the system 2, this key $KH_i$ being unknown to the other terminals,
a field "Record-A" containing an authorization or, on the contrary a prohibition, to record multimedia contents,
a field "Read-A" containing an authorization or, on the contrary a prohibition, to read recorded multimedia contents from other terminals,
a field "Share-A" containing an authorization, or on the contrary a prohibition, to share recorded multimedia contents, and
a field "Life T" containing a Lifetime for a licence associated with a recorded multimedia content.

A cryptographic key $K_{TR}$ specific to the network head 6 is also recorded in the memory 40.

The server 34 also stores, in the memory 40, the messages $ECM_t$ broadcast by the network head 6 during the last x hours, where x is a number greater than two.

For example, x is greater than 24 or 48. x is also chosen such that the period of storage of a message $ECM_t$ in the memory 40 does not exceed the duration $\Delta_{ECM\text{-}REF}$. Preferably, x is less than 168.

The system 2 also comprises a sharing server 50 capable of constructing a catalogue of the different recorded multimedia contents available in the system 2. To this end, the server 50 is connected to the network 36. It comprises an electronic computer 52 capable of executing instructions stored on an information storage medium. For this, it is connected to a memory 54 containing instructions for the execution of the method of FIG. 2 or 3, when they are executed by the computer 52. Here, this memory 54 also comprises a catalogue 56 and a database 58.

The catalogue 56 associates with each identifier RECORD-ID of a recorded multimedia content, the following information:
one or more identifiers STB-ID of receiving terminals on which this recorded multimedia content is stored,
a date of recording of this multimedia content,
a recording duration.

The catalogue 56 contains, preferably, other information on the recorded multimedia content such as the title of the recorded multimedia content and a brief description of this content.

The database 58 associates, with each identifier STB-ID of a terminal, the following information:

an indicator of the geographic position where this terminal is located, an indicator of the bandwidth available for downloading a recorded multimedia content from this terminal, and an address STB-URL for connection to this terminal via the network 36.

The indicator of the geographic position may be an IP (Internet Protocol) address, or a Wifi node identifier or a DSLAM (Digital Subscriber Line Access Multiplexer).

The system 2 typically comprises several thousands of receiving terminals.

These terminals are better known as "set-top boxes". To simplify FIG. 1, only three terminals 60 to 62 have been represented.

The terminal 60 has the capacity to record a multimedia content. It is also capable of reading a multimedia content recorded by any one of the terminals of the system 2 and displaying this recorded multimedia content in clear on a display 63.

The display 63 is, for example, a screen.

Furthermore, it generally has the capacity to descramble, as it is received, a multimedia content broadcast by the network head 6 to display it in clear on a screen.

To this end, the terminal 60 is equipped with an electronic computer 64 connected to an information storage medium 66. This computer 64 is capable of executing instructions stored on the medium 66 to implement the method of FIG. 2 or 3. To this end, the medium 66 notably comprises the instructions:

of a recording and reading module 68, of a conditional access agent 70, and of a descrambler 72.

The medium 66 also comprises the identifier STB-ID uniquely identifying this terminal out of all the terminals of the system 2.

The computer 64 is also connected to a mass memory 74 intended to store the recorded multimedia contents. This memory 74 is typically a mass storage peripheral device such as a hard disk, a USB (Universal Serial Bus) key or similar. Here, this memory 74 is housed inside the terminal 60 or directly connected thereto.

The terminal 60 also comprises a security processor 76 which processes confidential information such as cryptographic keys. To preserve the confidentiality of this information, this processor 76 is designed to be as robust as possible with respect to attempted attacks conducted by computer hackers. It is therefore more robust to these attacks than the other components of the terminal 60. To this end, the processor incorporates its own electronic computer 77 connected to its own memory 78 which is only accessible by the processor 77. Typically, the memory 78 is incorporated in the processor so that the latter is protected and made as robust as possible. Here, the processor 76 is a removable security processor such as a chipcard.

The memory 78 notably comprises the cryptographic key $KH_i$ specific to the terminal 60. In this description, it is said that a key is "specific to" a device when it uniquely identifies this device out of all the devices of the system 2. It is therefore unique to this device.

Only the chipcard 76 of the system 2 has the key $KH_i$. For example, this key $KH_i$ is transmitted to the terminal 60 in an EMM message or inscribed when the chipcard is personalized, that is to say when the latter is manufactured. The index "i" of the key $KH_i$ identifies the terminal.

In this embodiment, it is assumed that all the terminals are structurally identical and that they differ from one another only by information that is specific to them such as the identifier STB-ID and the key $KH_i$. Thus, the terminals 61 and 62 are identical to the terminal 60, except that they are connected, respectively, to screens 80 and 82.

Hereinafter, to simplify the description, the terminals used to record are called "recorders" and the terminals used to read the recorded multimedia content are called "readers". $KH_e$ and $KH_l$ also denote the keys $KH_i$, respectively, of the recorder and of the reader.

The operation of the system 2 will now be described with reference to the method of FIG. 2 in the particular case where the terminals 60 and 61 are, respectively, the recorder and the reader.

An initialization phase or reset phase 150 is first carried out.

At the start of this phase 150, in a step 152, the network head 6 transmits to each terminal, for example via EMM messages, its configuration, that is to say, the only information contained in the table 42 which concerns it.

In a step 154, in response to the reception of these EMM messages, each conditional access agent of the terminals stores the received configuration. The phase 150 then ends.

In a step 162, the network head 6 broadcasts a scrambled multimedia stream in which the multimedia content is multiplexed with the corresponding messages $ECM_t$. These messages $ECM_t$ therefore contain the cryptograms of the control words that can be used to descramble this multimedia content.

A recording phase 170 then begins.

The phase 170 begins with a step 172 of acquisition of a command from the user to record the multimedia content currently being broadcast.

In response, in a step 174, the module 68 receives and demultiplexes the received multimedia stream in order to extract therefrom an SPTS (Single Program Transport Stream) stream containing the video, audio and teletext components of just this multimedia content. The module 68 also extracts from this multimedia stream the messages $ECM_t$ corresponding to the multimedia content to be recorded and transmits them to the conditional access agent 70.

In a step 176, the agent 70 carries out various checks. For example, it checks that the recorder 60 is authorized to record multimedia contents. This check is done, for example, using the content of the field "Record-A" received previously. It also checks in this step that the message $ECM_t$ corresponding to the multimedia content does not contain any prohibition to record. The incorporation in the messages $ECM_t$ of a prohibition to record makes it possible to prevent the recording of certain multimedia contents received, for example to observe the author's rights.

If, for one of the reasons described above, the recording of the multimedia content is not possible, then the method returns to the step 172. Otherwise, the agent 70 proceeds with a step 178.

In the step 178, the agent 70 generates an identifier RECORD-ID enabling the recorded multimedia content to be identified. Preferably, the method for generating this identifier is such that the identifier RECORD-ID generated makes it possible to quickly identify the multimedia content regardless of the recorder which generates it. For example, this identifier RECORD-ID is generated from the recording start date and the identifier CHANNEL-ID of the recorded television channel. This identifier may also be generated according to the terminal identifier STB-ID.

At the end of the step 178, the agent 70 sends the identifier RECORD-ID to the module 68 and each received message $ECM_t$ to the chipcard 76.

In a step 182, the chipcard 76 checks the following conditions:

the message $ECM_t$ corresponding to the multimedia content does not contain any prohibition to record, and the access entitlements that it contains correspond to the access conditions CA contained in the messages $ECM_t$.

If one of these conditions is not satisfied, the recording is disabled and the method returns to the step 172.

Then, in a step 184, the chipcard decrypts the cryptograms $CW_t^{Ka}$ and $CW_{t+1}^{Ka}$ contained in the messages $ECM_t$ received to obtain the control words $CW_t$ and $CW_{t+1}$ in clear. This decryption is done using the subscription key $K_a$. The key $K_a$ is transmitted by the network head, by EMM message, to the terminals that have taken out a subscription enabling the multimedia content to be descrambled. The key $K_a$ is the same for all the terminals authorized to descramble this multimedia content.

In a step 186, the chipcard 76 protects the recorded multimedia content. To this end, here, it encrypts the control words $CW_t$ and $CW_{t+i}$ with the local key $KH_e$. Then, the cryptograms $CW_t^{KHe}$ and $CW_{t+1}^{KHe}$ are transmitted to the agent 70.

In a step 190, in response, the agent 70 constructs a licence to read the recorded multimedia content. More specifically, in the step 190, the agent 70 associates with each cryptogram $CK^{KHe}$ the time index $ECM\text{-}REF_t$ identifying the cryptoperiod $CP_t$ of the multimedia content that has to be descrambled with the control word $CW_t$.

Then, the agent 70 records each cryptogram $CK^{KHe}$ associated with its time index $ECM\text{-}REF_t$ in a control word block.

Preferably, the agent 70 also inserts the required moral level. Finally, in the step 190, the agent 70 determines the lifetime of the licence by adding the duration contained in the field "Life-T" to the current date.

Once this licence is constructed, in a step 192, the module 68 records the scrambled multimedia content in the memory 74 associated with the licence constructed by the agent 70.

It will be noted that, in the phase 170, the recorded multimedia content remains scrambled and is not descrambled to be rescrambled once again.

In a step 194, the recorder 60 transmits the constructed licence to the authorization server 34.

In a step 196, the authorization server 34 checks the authenticity of the identifier CHANNEL-ID associated with the cryptograms $CW_t^{KHe}$ in the received licence. Here, it compare the control words contained in the licence to those contained in the messages $ECM_t$ that it has stored for the channel corresponding to the identifier CHANNEL-ID contained in the licence. If the control words of the licence correspond to those stored in the messages $ECM_t$ broadcast on this channel, then the identifier CHANNEL-ID contained in the licence is correctly authenticated. For example, in the step 196, the server 34 extracts the cryptograms $CW_t^{Ka}$ from the messages $ECM_t$ broadcast on this channel and corresponding to the time indices $ECM\text{-}REF_t$ contained in the licence. To this end, the server 34 stores, as they are broadcast, all the messages $ECM_t$ of all the channels and retains them, associated with their respective identifier CHANNEL-ID, for the duration of x hours. Then, it decrypts:

the cryptograms $CW_t^{KHe}$, and the cryptograms $CW_t^{Ka}$ contained in the ECM messages that it has stored on the channel corresponding to the identifier CHANNEL-ID and to the time indices $ECM\text{-}REF_t$ contained in the licence. Once decrypted, it proceeds to compare the control words contained in the licence to those extracted from the recorded messages $ECM_t$.

If the authenticity of the identifier CHANNEL-ID has not been able to be checked, then the following steps are not executed. Furthermore, the server 34 can send a message invalidating the recording to the recorder 60 to prevent the use of this recorded multimedia content.

Otherwise, in a step 198, the authorization server 34 generates an authentication ticket from the control words $CW_t$ contained in the licence, from the identifier CHANNEL-ID extracted from the ECM messages used in the step 196 and from a secret specific to the network head 6. For example, the authentication ticket corresponds to the signing of these control words and of the identifier CHANNEL-ID using the key $K_{TR}$.

In a step 200, the server 34 transmits the constructed authentication ticket to the recorder 60 via the network 36. The recorder 60 receives this ticket and stores it in the memory 74 associated with the recorded multimedia content and with the constructed licence.

In a step 202, the recorder 60 transmits to the sharing server 50 the information necessary for it to be able to construct or update the catalogue 56 of the multimedia contents recorded by the different recorders of the system 2. Typically, the recorder 60 transmits the following information:

the identifier RECORD-ID of the recorded multimedia content, the date of recording of this multimedia content and the duration of the recording, the identifier CHANNEL-ID of the channel on which this multimedia content has been recorded, its own identifier STB-ID, and its network address STB-URL.

In the step 202, the recorder may also transmit to the server 50 other information relating to the recorded multimedia content such as its name and a brief description of this multimedia content. The title and the description of the recorded multimedia content are, for example, obtained from the information concerning this multimedia content given by an EPG (Electronic Program Guide) service.

In response, in a step 204, the server 50 constructs or updates the catalogue 56.

Then, the recording phase ends in a step 206.

In this method, any reader of the system 2 can ask to read any multimedia content recorded by any recorder. The rest of this description is given in the particular case in which it is the reader 61 which asks to read the multimedia content recorded by the recorder 60 in a phase 208.

This phase 208 begins with a step 210 of acquisition of a request to read a recorded multimedia content. This read request is acquired by the reader 61.

In response, in a step 212, the reader 61 checks whether it is authorized to read the shared recorded multimedia contents. This check is carried out on the basis of the content of the "SHARE-A" field received. In the negative, the method returns to the step 210.

In the affirmative, in a step 214, the reader 61 connects to the sharing server 50 via the network 36. In this step, the reader transmits to the server 50 its identifier STB-ID.

In response, in a step 216, the server 50 transmits to the reader 61 information concerning the multimedia contents present in the catalogue 56. The reader 61 presents this information to the user via a human-machine interface. Here, the human-machine interface is the screen 80.

In a step 218, in response to a command from the user, the reader 61 transmits the identifier RECORD-ID of a multimedia content selected by the user from the information presented.

In a step 220, the server 50 constructs a list of one or more recorders storing the selected multimedia content. For example, here, if there are fewer than two identifiers STB-ID associated with the selected identifier RECORD-ID, then the list constructed comprises all these identifiers STB-ID. If there are more than two identifiers STB-ID associated with the selected identifier RECORD-ID, then, the server 50 selects a restricted number of identifiers STB-ID to construct the list. For example, the server 50 selects only the identifiers of the recorder or recorders which is/are either closest to the reader or which offers/offer the best bandwidth. For example, the server 50 determines the geographic proximity of the reader and of the recorders from the identifier STB-ID of the reader, from the identifiers STB-ID associated with the identifier RECORD-ID selected in the catalogue 56, and from the database 58. Using this database 58, it can also select the recorder or recorders which offers/offer the best bandwidth to transmit a multimedia content.

On completion of the step 220, the identifiers STB-ID of the selected recorders are grouped together to form the list of recorders. This list also contains the network address STB-URL of each selected recorder.

In a step 222, the server 50 transmits to the reader 61, which receives it, this list associated with the selected identifier RECORD-ID.

In a step 224, the reader 61 sends a licence request to the authorization server 34 via the network 36. This request contains in particular the list of recorders, the selected identifier RECORD-ID and the identifier STB-ID of the reader 61.

In a step 226, the server 34 receives this list and, in response, connects to at least one of the recorders in the list of recorders received. For example, for this, the server tries first to connect to the first recorder in this list. If the connection, via the network 36, with this recorder cannot be set up, then it tries to connect to the second recorder that appears in this list and so on until is successfully connects to one of the recorders in this list. Possibly, after having tried unsuccessfully to connect to each recorder in the list, the server 34 may connect to the server 50 to obtain additional addresses of recorders likely to supply the same multimedia content. Thus, the use of a list of recorders makes it possible to limit problems caused by a disconnection of a recorder. For the rest of the description, it is assumed that the server 34 is connected to the recorder 60.

Once connected to a recorder, still in the step 226, the server 34 transmits the licence request to it. This licence request includes the selected identifier RECORD-ID.

In response, in a step 228, the recorder 60 sends to the server 34 the licence and the authentication ticket associated with the selected identifier RECORD-ID.

In a step 230, the server 34 receives the licence and checks the authenticity of the identifier CHANNEL-ID contained in this licence. For example, it signs the control words and the identifier CHANNEL-ID contained in the licence in the same way as in the step 198. If the signature obtained in this way corresponds to the authentication ticket, then the authenticity of the identifier CHANNEL-ID is confirmed. Otherwise, the method returns to the step 210.

If the authenticity of the identifier CHANNEL-ID is confirmed, in a step 236, the server 34 checks whether the reader 61 is authorized to access the multimedia content broadcast on the television channel identified by the identifier CHANNEL-ID. For example, the server 34 compares:

the identifier CHANNEL-ID established in the step 234,
with the access authorizations contained in the field "AA" associated with the identifier STB-ID of the reader in the table 42.

In this case, the content of the field "AA" is automatically constructed by the server 34 from the access entitlements to which the user of the terminal has subscribed. For example, the access authorizations contained in the field "AA" are identical to the access entitlements of the reader. Thus, the reader can only read multimedia contents recorded on channels for which it has taken out a subscription.

If the identifier CHANNEL-ID of the licence does not correspond to the access authorizations, then the method returns to the step 210. Otherwise, the method proceeds to a step 240 to construct a licence for the reader 61.

In this step 240, the server 34 decrypts the cryptograms $CW_t^{KHe}$ of the control word block of the licence received to obtain the control words $CW_t$ in clear. Then, the control words $CW_t$ are encrypted using the local key $KH_I$ of the reader 61. The keys $KH_I$ and $KH_e$ are obtained from the table 42 using the identifiers STB-ID of the recorder 60 and of the reader 61.

The cryptograms $CW^{KHI}$ obtained in this way form a new block of control words included in the constructed licence. The validity date of the constructed licence and the other information that this licence contains are taken to be equal to the corresponding information contained in the licence received.

In a step 242, once the construction of the licence is finished, the server 34 transmits to the reader 61 this constructed licence and the authentication ticket received. The act of sending the authentication ticket to the reader 61 enables this reader to act as recorder of this multimedia content with respect to other readers.

In a step 244, the reader receives this licence and this authentication ticket.

Then, the reader 61 downloads the selected multimedia content in peer-to-peer mode.

For this, in a step 246, it connects to at least one of the recorders identified by the list of recorders received in the step 222. For example, the reader 61 tries to connect to the first recorder identified in this list via the network 36. In cases of failure, it reiterates this attempt with one of the subsequent recorders in this list until it succeeds in connecting to one of these recorders. Thus, the recorder from which the licence has been constructed is not necessarily the same as the one from which the multimedia content will be downloaded. Here, it is again assumed that the reader 61 connects to the recorder 60.

In a step 248, once a connection is set up, the reader 61 downloads the multimedia content corresponding to the identifier RECORD-ID from the memory 74 of the recorder 61. Then, it decrypts the cryptograms $CW^{KHI}$ contained in the block of control words of the licence received. It uses the control words $CW_t$ obtained in this way to descramble the scrambled multimedia content downloaded from the recorder 61. The descrambled multimedia content is transmitted to the display 80 to be displayed in a manner that is directly perceptible and comprehensible to a human being.

Figure 2A:
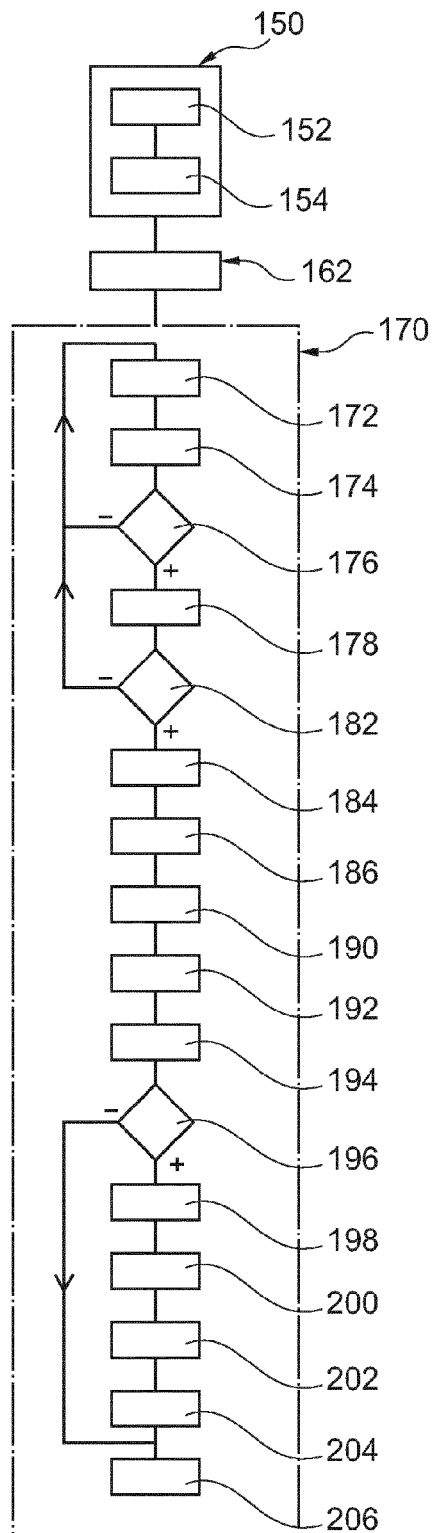
FIGS. 2A and 2B are a flow diagram of a first embodiment of a method for protecting a recorded multimedia content.
Figure 2B:
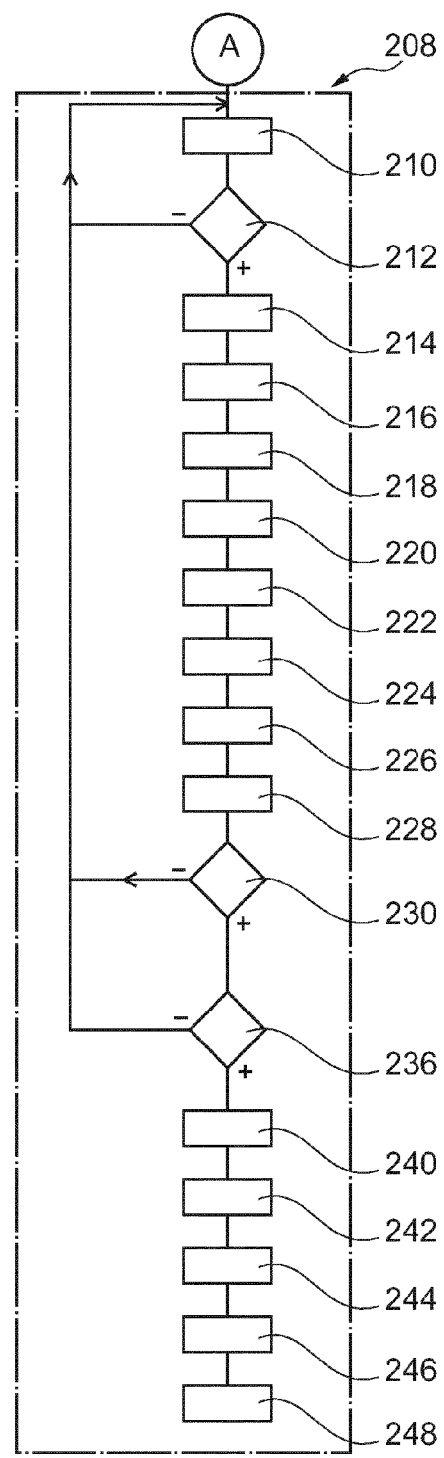
Figure 3:
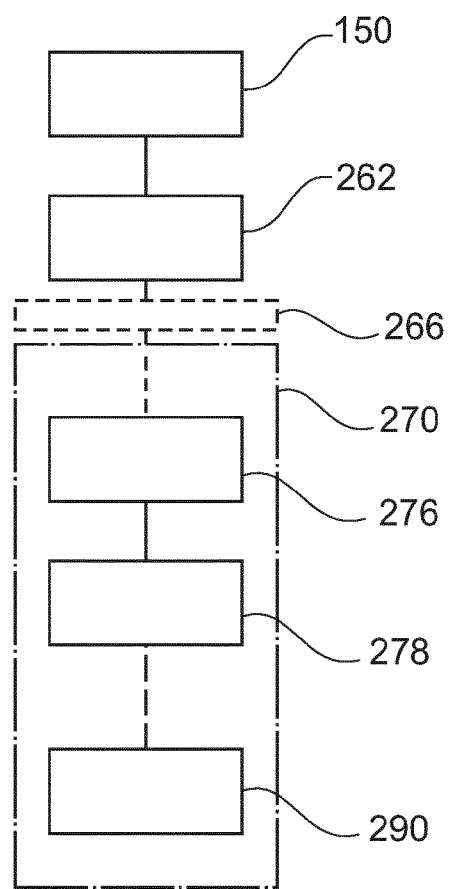
FIG. 3 is a flow diagram of another embodiment of a method for protecting a recorded multimedia content.

The method of FIG. 3 represents another possible embodiment of the method of FIG. 2. Since these methods are similar, only the differences between these methods are described in detail.

The method of FIG. 3 begins with the initialization step 150. Then, it continues with a step 262 of broadcasting of multimedia contents on a television channel. This step 262 is identical to the step 162 except that the network head inserts into each ECM message an identifier FRAG-ID of a television channel fragment. In this embodiment, each television channel is divided into a temporal succession of consecutive time fragments. Thus, each fragment corresponds to a quite specific time interval or time slot of the broadcast television channel. The fragment identifiers uniquely identify a particular fragment of the television channel. The fragment identifier incorporated in the ECM message is the identifier of the current fragment, that is to say of the fragment of the television channel currently broadcast by the network head. A fragment consists of an integer number of cryptoperiods. The number of cryptoperiods of a fragment is at least one and, preferably more than nine or ninety cryptoperiods. Typically, a fragment corresponds to a duration of several minutes whereas a cryptoperiod corresponds to a duration less than one minute. Generally, a cryptoperiod lasts 10 s. In this embodiment, a multimedia content extends over a number of immediately consecutive fragments.

The step 262 is followed by a phase 266 of recording of a multimedia content by any one of the recorders of the system 2. For simplicity, here, this phase 266 is identical to the phase 170 except that the steps 174 to 204 are reiterated for each fragment of the multimedia content. This phase 266 will not therefore be described in more detail. Hereinafter, the identifier RECORD-ID generated in the step 178 is denoted FRAG-ID because it corresponds to the fragment identifier.

It will be noted that, in the phase 204, the server 50 constructs a catalogue of the different fragments recorded by the different recorders. This catalogue contains, for each recorded fragment, the identifiers STB-ID of the recorders storing this fragment and the start date of this fragment, the duration of this fragment and the identifier FRAG-ID of this fragment.

After having been recorded, a fragment or a set of fragments can be read in a phase 270. This phase 270 is identical to the phase 208 except that the steps 216, 218 and 242 are respectively replaced by steps 276, 278 and 290.

In the step 276, the reader 61 generates a human-machine interface enabling it to select a succession of fragments recorded on a given television channel. For example, via this human-machine interface, the reader 61 acquires the identifier CHANNEL-ID of the television channel, a recording start date and a recording duration.

In the step 278, the search criteria acquired by the reader 61 are transmitted to the server 50. From these search criteria, the server 50 selects the different corresponding identifiers FRAG-ID. The subsequent steps 220 to 240 are reiterated for each identifier FRAG-ID selected in the step 278.

In the step 290, the different licences constructed for each of the selected fragments are concatenated to construct a complete licence. It is this complete licence which is transmitted to the reader. During the construction of this complete licence, the access criteria and the most strict validity date out of the licences constructed for each of the fragments are assigned to this complete licence. It is this complete licence which is sent to the reader 61.

Then, the steps 244 to 248 are reiterated for each selected fragment.

The method of FIG. 3 enables the reader to display a multimedia content composed of a number of fragments possibly recorded by different recorders.

Numerous other embodiments are possible. For example, the downloading in peer-to-peer mode can be replaced by downloading from the sharing server. In this case, the multimedia content is recorded in scrambled form in the memory 54 of the sharing server. For example, the recorded multimedia content is downloaded from the recorder, via the sharing server, at the same time as the recorder sends to it the information needed to construct the catalogue. In another embodiment, the recorder directly stores the recording of the multimedia content in the memory 54. Thus, in this last embodiment, the recorder does not need the memory 74.

The downloading of the recorded multimedia contents by the reader can be done in different ways. For example, this downloading can be done in stream reading mode, better known by the term "streaming". The reader can also connect simultaneously to a number of recorders, identified in the list that it has received, to simultaneously download a number of different fragments of the multimedia content.

The list of recorders from which the reader can download the multimedia content can also be updated dynamically. For example, the reader can connect to the sharing server to update this list.

In a simplified embodiment, the list of recorders constructed by the sharing server contains a single recorder identifier STB-ID.

The key $KH_i$ is not necessarily specific to a single terminal. The key $KH_i$ may also be the same for a group of p terminals, in which p is a natural integer strictly greater than one and strictly less than N, N being the total number of terminals in the system 2.

The use of the "SHARE-A" field can be omitted.

As a variant, the recorder descrambles the multimedia content to be recorded with the control words in clear $CW_t$, then once again scrambles the multimedia content with one or more keys which are specific to it. For example, the recorder scrambles the multimedia content with a key $KH_{cm}$. The recorded multimedia content is the multimedia content scrambled with the key $KH_{cm}$. Then, the method is, for example, the same as that previously described except that the cryptogram $KH_{cm}^{KHe}$ is used instead of the cryptograms $CK^{KHe}$.

The authorization server can perform operations other than those described previously. For example, it can reverse the order of the bits of the control words inserted into the licence constructed according to the type of reader having requested this licence.

There are numerous different ways of constructing the authentication ticket. For example, the recorder transmits a predetermined number of ECM messages preferably greater than two or five to the authorization server. The authentication ticket is constructed according to the control words and the identifier CHANNEL-ID of the television channel of each of these ECM messages. During the checking process, the authorization server checks that the control words of the authentication ticket correspond to control words contained in the block of control words of the licence received. If these control words correspond, the server 34 recovers the identifier CHANNEL-ID in the authentication ticket. In another embodiment, the recorder stores one or more ECM messages. These ECM messages then form the authentication ticket. In this embodiment, the recorder no longer has to send one or more ECM messages received to obtain an authentication ticket in response.

As a variant, the channel identifier is encoded in each control word. The server 34 can then establish the identifier CHANNEL-ID from the control words of the licence received.

The checking of the authenticity of the identifier CHANNEL-ID can be done in numerous different ways.

As a variant, the authentication of the identifier CHANNEL-ID can be omitted.

In another embodiment, the identifiers $ECM-REF_t$ are generated by the recorder.

To set up a connection via the network 36, it is also possible to proceed differently from what has been described previously. For example, to set up a connection, the transmitter broadcasts, over the network 36, to all the possible receivers, a message containing the identifier of the receiver with which it wants to set up a communication. In response, this receiver sets up the connection with the transmitter. Thus, it is not necessary for the system 2 to include a database associating with each identifier STB-ID its address STB-URL.

The network 8 and the network 36 may be one and the same. Such is in particular the case if the television channel broadcasting is done via the Internet network.

The readers and the recorders are not necessarily identical. For example, the reader may have no security processor. In this case, the decryption is done by the conditional access agent executed by the computer of the reader.

The sharing server can be incorporated in the conditional access system 28.

In another variant, the conversion of the licence of the recorder into a licence that can be used by the reader can be done by devices other than the authorization server. For example, this conversion is done by an ADSL (Asymmetric Digital Subscriber Line) modem which connects the recorder to the network 36.

The recorded multimedia content can be downloaded from the memory of a terminal other than the terminal which has recorded it. For example, the reader 61 can receive and record locally a multimedia content initially recorded by the recorder 60 and, later, share this recorded multimedia content with the reader 62.

In another variant, the authorization or not to record a multimedia content is deduced from the access entitlements of the terminals. For example, these access entitlements are compared to access rights contained in the ECM messages received to deduce therefrom the authorization and, alternatively, the prohibition to record the multimedia content.

The access authorization contained in the field "AA" is not necessarily identical to the access entitlements of the same reader. For example, the access authorization may comprise a date from which the recorded multimedia contents sharing service has been activated. The reader is then not authorized to read a recorded multimedia content before that date. The access authorization may also be totally independent of the access entitlements of the reader. For example, the reader has access entitlements that do not include the recorded channel so that it cannot display it in real time. On the other hand, its access authorization authorizes it to display a multimedia content recorded on this channel. In the latter case, the access authorization may exclude certain multimedia contents recorded on this channel on the basis of criteria such as the date, the time of recording and the duration of the recording There are numerous ways of comparing the channel identifier received by the authorization server to the access authorization of the reader. This comparison can be direct if the access authorization directly encodes channel identifiers. The comparison may also be indirect. For example, the channel identifier received is used to find information which is in turn compared to the access authorization. For example, the channel identifier is used with the recording start date to identify, in a database, the type of the multimedia content. For example, the type can be chosen from the group consisting of "film", "documentary", "news", "cartoons". Then, the type identified is compared to the access authorization.

The scrambling of the multimedia contents can be done differently. For example, the scrambling is done at a level other than the TS level as proposed in the Ismacryp specification. The different components of the multimedia content, such as the video and audio, are not necessarily scrambled with the same control word.

The recording of a multimedia content can be programmed by the user.

In the step 220, in the case of the method of FIG. 3, the server 50 can also select the identifiers STB-ID to be included in the list of recorders so as to minimize the number of recorders selected by preferably choosing the recorder or recorders on which the greatest number of selected fragments is stored.

The invention claimed is:

1. A method for protecting recorded multimedia content and enabling said recorded multimedia content to be shared between recorders and readers of multimedia content connected to one another via a wide area information transmission network, said method comprising a network head broadcasting, on a channel, scrambled multimedia content and entitlement control messages containing cryptograms $CW^{Ka}$ of control words CW that enable descrambling of respective crytoperiods of said scrambled multimedia content, wherein said method further comprises a recorder receiving said scrambled multimedia content and said entitlement control messages, decrypting a cryptogram $CW^{Ka}$ contained in a received entitlement control message using a subscription key $K_a$, read-protecting said scrambled multimedia content by using a local key $KH_e$, to encrypt said decrypted control words to generate cryptograms $CW^{KHe}$, and recording said cryptograms $CW^{KHe}$ and said scrambled multimedia content with said control words CW, and an authorization server, common to all said readers, receiving a channel-identifier that identifies said channel on which said multimedia content has been broadcast by said network head, and in response to a request, by a reader, to read said recorded multimedia content, determining whether said reader is or is not authorized to descramble said multimedia content recorded on said channel according to access authorizations associated with said reader and said received channel-identifier, if said reader is not authorized to descramble said multimedia content recorded on said channel, preventing said reader from reading said recorded multimedia content, and if said reader is authorized to descramble said multimedia content recorded on said channel, decrypting said cryptograms $CW^{KHe}$ with said key $KH_e$, re-encrypting said duly decrypted control words CW with a local key $KH_l$ of said reader, and transmitting said cryptograms $CW^{KHl}$ to said reader, said method further comprising said reader downloading said scrambled multimedia content recorded by said recorder, receiving said cryptograms $CW^{KHl}$, decrypting said cryptograms with a local key $KH_l$, and descrambling said downloaded multimedia content with said decrypted control words CW.

2. The method of claim 1, wherein said entitlement control messages broadcast by said network head contain said channel-identifier, and wherein said method further comprises said authorization server receiving said cryptograms $CW^{KHe}$ associated with said received channel-identifier, checking authenticity of said channel-identifier associated with at least one of said cryptograms $CW^{KHe}$ received by comparing said control word or words received to said control word or control words CW contained in said entitlement control messages broadcast by said network head on a channel corresponding to said received channel-identifier, and preventing reading, by said reader, of said recorded multimedia content in the absence of correlation between said compared control word or control words CW.

3. The method of claim 1, further comprising each recorder storing, in a memory space that is specific to said recorder, at least one of said multimedia content and content that said recorder has recorded, a sharing server common to all said recorders constructing a catalog, wherein said catalog contains at least one identifier of each item of recorded multimedia content associated with at least one identifier of said recorder that stores said recorded multimedia content, said method further comprising, in response to a reader's selection, in said catalog, of an identifier of an item of recorded multimedia content, said reader receiving at least one of said identifiers of recorders storing said recorded multimedia content, and downloading, via said wide area information transmission network, said recorded multimedia content from at least one of said recorders for which said identifier has been received.

4. The method of claim 3, further comprising, in response to recording of multimedia content, said recorder transmitting, to said sharing server, a recorder-identifier thereof and said identifier of said recorded multimedia, and, said sharing server constructing said catalog from said information transmitted by said recorders.

5. The method of claim 1, further comprising a sharing server, common to all said recorders, constructing a catalog containing at least one identifier of each item of said multimedia content recorded by said recorders associated with a list of recorder-identifiers of recorders having recorded said multimedia content, in response to a reader's selection, in said catalog, of an identifier of an item of multimedia content, an authorization server attempting to establish a connection with a recorder corresponding to one of said recorder-identifiers of said list associated with said identifier of said selected item of multimedia content to obtain said cryptograms $CW^{KHe}$ and, if said connection attempt fails, said authorization server attempting to establish a connection with another recorder corresponding to another identifier on said list.

6. The method of claim 1, further comprising said network head transmitting each entitlement control message associated with a current time-fragment identifier, said channel being divided into a multitude of successive time fragments so that said recorded multimedia content is distributed over multiple time fragments, said fragment-identifier uniquely identifying one of said fragments and said current fragment-identifier identifying a time fragment of a channel currently being broadcast by said network head, a duration of said time fragment being greater than or equal to a duration of a cryptoperiod, a sharing server, common to all said recorders, constructing a list associating, for each complete fragment recorded by a recorder, said fragment-identifier and at least one recorder-identifier of a recorder having recorded said complete fragment, and wherein preventing said reader from reading said recorded multimedia content includes, for each fragment of said multimedia content, identifying said recorder from which said cryptogram $CW^{KHe}$ can be obtained by virtue of said recorder-identifier associated with said fragment-identifier in said constructed list and obtaining said cryptogram $CW^{KHe}$ from said identified recorder.

7. The method of claim 1, further comprising said network head transmitting each entitlement control message associated with a current time-fragment identifier, said channel being divided into a multitude of successive time fragments so that said recorded multimedia content is distributed over multiple time fragments, said fragment-identifier uniquely identifying one of said fragments and said current fragment-identifier identifying said time fragment of said channel currently being broadcast by said network head, a duration of said time fragment being greater than or equal to a duration of a cryptoperiod, a sharing server, common to all said recorders, constructing a list associating, for each complete fragment recorded by a recorder, said fragment-identifier of said fragment, and a recorder-identifier of a recorder having recorded said complete fragment, and for each fragment of said multimedia content, said reader identifying said recorder from which said fragment can be downloaded by virtue of said recorder-identifier associated with said fragment-identifier of said fragment in said list, and downloading said fragment from said identified recorder.

8. The method of claim 7, wherein, when recorders have recorded at least one of the same multimedia content and the same time fragment, said method further comprising said sharing server selecting, only from recorder-identifiers of said recorders, a restricted number of recorder-identifiers, said selection being made based on a factor selected from the group consisting of geographic proximity between said reader and recorders identified by said selected recorder-identifiers, and bandwidth available for exchanging information with recorders identified by said selected recorder-identifiers, and said sharing server associating, in said constructed list, said identifier of said multimedia content or fragment only with said selected recorder-identifiers.

9. The method of claim 6, further comprising, in response to said recording a complete fragment of said multimedia content, said recorder transmitting, to said sharing server, a recorder-identifier thereof, and a fragment-identifier of said complete fragment, and said sharing server constructing said list from said fragment and recorder-identifier.

10. A non-transitory information storage medium having encoded thereon instructions for causing a computer to execute the method of claim 1.

11. An apparatus comprising an authorization server, said authorization server comprising a programmable electronic computer, and a non-transitory information storage medium having encoded thereon instructions that, when executed by said computer, cause said computer to implement those steps in the method recited in claim 1 that are executed by an authorization server.

12. The apparatus of claim 11, wherein said authorization server is configured to receive an identifier of said channel on which said multimedia content has been transmitted by said network head, in response to a request to read said recorded multimedia content, by any one of said readers, determine whether said reader is or is not authorized to descramble said multimedia content recorded on said channel according to said access authorization associated with said reader and said received channel identifier, if said reader is not authorized to descramble said multimedia content recorded on said channel, preventing said reader from reading said recorded multimedia content, and if said reader is authorized to descramble said multimedia content recorded on said channel, authorize decryption of said cryptograms $CW^{KHe}$ with said key $KH_e$, reencryption of said decrypted control words CW with a local key $KH_l$ of said reader, and transmission of said cryptograms $CW^{KHl}$ to said reader.

13. An apparatus comprising a sharing server, said sharing server comprising a programmable electronic computer, and a non-transitory information storage medium containing instructions that, when executed by said computer, cause said computer to execute those steps in the method recited in claim 1 that are executed by a sharing server.

14. The apparatus of claim 13, wherein said sharing server is configured to at least one of construct a catalog containing at least one identifier of each recorded multimedia content associated with at least one identifier of said recorder storing said recorded multimedia content or having recorded said multimedia content, and construct a list associating, for each complete fragment recorded by a recorder, an identifier of said fragment and at least one identifier of a recorder having recorded said fragment.

15. An apparatus comprising a recorder, said recorder comprising a programmable electronic computer, and a non-transitory information storage medium having encoded thereon instructions for causing said programmable electronic computer to implement those steps in claim 1 that are executed by said recorder.

16. The apparatus of claim 15, wherein said recorder is configured to at least one of in response to recording of multimedia content, transmit, to said sharing server, a recorder-identifier thereof and an identifier of said recorded multimedia content, and in response to recording of a complete fragment of multimedia content, transmit, to said sharing server, a recorder-identifier thereof and an identifier of said complete fragment.

17. An apparatus comprising a network head, said network head comprising a conditional access system, said conditional access system comprising a programmable electronic computer, and non-transitory information storage medium containing instructions for causing said programmable electronic computer to implement steps carried out by said network head in claim 1.

\* \* \* \* \*